Nov. 14, 1933.    J. V. GIESLER    1,935,118
SHUTTER THERMOSTAT
Filed April 27, 1931
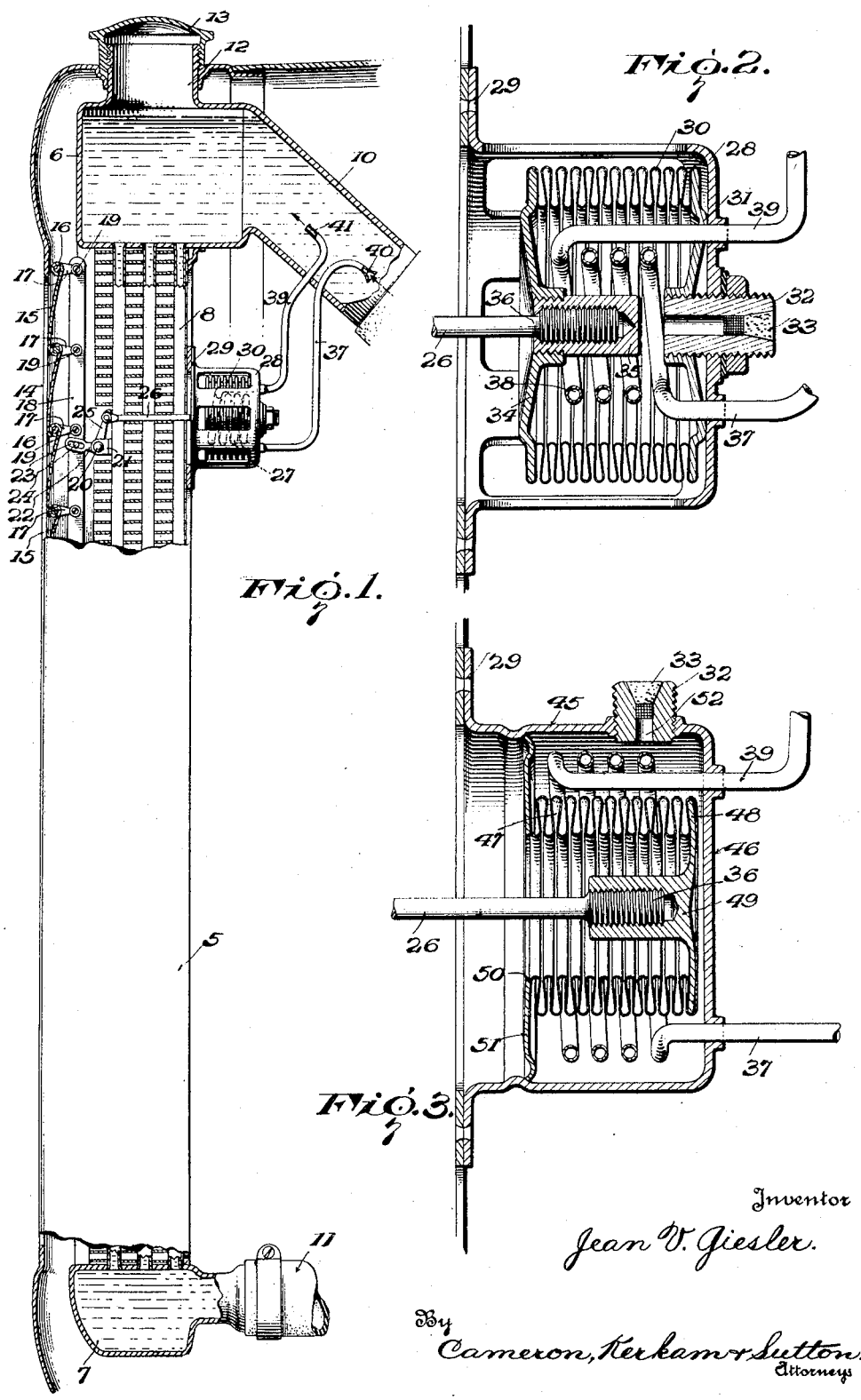

Patented Nov. 14, 1933

1,935,118

UNITED STATES PATENT OFFICE 1,935,118

SHUTTER THERMOSTAT

Jean V. Giesler, Knoxville, Tenn., assignor to The Fulton Sylphon Company, Knoxville, Tenn., a corporation of Delaware Application April 27, 1931. Serial No. 533,273

15 Claims. (Cl. 236—35)

This invention relates to apparatus for regulating the temperature of the medium used in the cooling system of an internal combustion engine.

Regulating apparatus has heretofore been used to control the temperature of the circulated medium in the cooling system of an automobile engine in which a thermostat actuates mechanism such as shutters or valves for varying the effect of the cooling system. To insure dependable operation of such regulators the controlling mechanism should respond accurately to variations in the temperature of the engine, and various schemes have heretofore been proposed for obtaining the desired results.

One of the objects of the present invention is to provide a novel regulating apparatus which may be added as a unit to any automobile engine and which will be actuated in accordance with the changes in the temperature of the engine to control the temperature of the medium in the cooling system.

Another object of the present invention is to provide a novel thermostat motor for a regulating apparatus adapted to control the temperature of the medium in a cooling system of an internal combustion engine, and which is adapted to operate promptly after the engine stops.

Another object of the present invention is to provide a novel apparatus for regulating the temperature of the medium used in the cooling system of an automobile engine in which a relatively small part of the cooling medium is passed through a thermostat to actuate the control mechanism in accordance with the actual temperature of the cooling medium.

Another object of the present invention is to provide a novel temperature regulator for the cooling system of an automobile engine which is compact, simple, economical of manufacture and efficient for the purpose intended.

These and other objects will be more apparent from the following description and the drawing in which like reference characters denote like parts throughout the several views. It is to be expressly understood, however, that the drawing is for the purpose of illustration only and is not a definition of the limits of the invention, reference being had for this purpose to the appended claims.

In the drawing:

Fig. 1 is a side elevational view of an automobile radiator partly in section showing thermostatically operated regulating apparatus incorporating the novel features of the present invention;

Fig. 2 is a vertical sectional view of the thermostatic motor shown in Fig. 1; and Fig. 3 is a vertical sectional view of a modified form of the thermostatic motor shown in Fig. 1.

Referring to Fig. 1 of the drawing where the embodiment of the invention selected for illustration includes an automobile radiator 5 of the usual type in which an upper header 6 and a lower header 7 are connected by means of tubes 8. The radiator 5 is adapted to be connected with the remainder of the cooling system of the engine in the usual manner by means of a conduit 10 between the upper header 6 and the top of the engine cooling jacket (not shown), and a conduit 11 extending between the lower header 7 and the lower end of the engine water jacket or pump (not shown). With this construction the cooling medium is circulated from the lower header 7 through conduit 11 and the engine jacket to the upper conduit 10 and into the header 6 and then by gravity the medium returns through the tubes 8 to the lower header 7 and is cooled by the flow of air between the tubes; a filler hole 12 and radiator cap 13 being provided for adding a cooling medium such as water when necessary.

At the front of the radiator a hood is provided which may be attached to the radiator by any suitable means. This hood has a stationary part 14 in the form of a frame surrounding an aperture of approximately the total area of the radiator, and moving parts in the form of shutters 15 adapted to overlap and entirely close the aperture formed in the frame 14 and which are pivoted at their ends in the frame 14 by means of pins 16. The shutters 15 may be moved about their pivot 16 for varying the effective area of the radiator in any suitable way, and to this end, arms 17 are provided on each shutter which in turn are pivotally connected to a bar 18, extending the entire length of the hood, by means of pins 19. A bell crank is provided for moving the bar 18 and varying the position of the shutters 15. This bell crank is pivoted as at 20 to a stationary support 21 and has an arm 22 provided with a slot 23 engaging a pin 24 on the bar 18, the slot 23 allowing relative lateral movement between the pin 24 and arm 22. The other arm 25 of the bell crank is pivotally connected to one end of a link 26 which is fixed at its other end to a thermostat 27.

This thermostat as more clearly shown in Fig. 2 is of the type in which an expansible and contractible bellows is actuated by a thermosensitive fluid. The stationary part of this thermostat consists of a shell or frame 28 suitably apertured to provide circulation of air and supported on part of the rigid structure such as the radiator itself, by any suitable means, legs 29 being shown with apertures for receiving bolts, screws, rivets, or the like. Within the shell 28 the bellows 30 is positioned with a head 31 rigidly attached to the shell, as by means of a plug 32 having a screw threaded engagement with the frame 28 and sealed to the head 31 in any suitable manner such as soldering or welding, the plug having a bore 33 for charging the bellows with a thermosensitive fluid. A movable head 34 is sealed at its outer periphery to the other end of the bellows 30 and as shown has a block 35 fixed at its center by a screw threaded engagement and suitable sealing means. This block 35 is bored and tapped to receive the threaded end 36 of the actuating link 26.

The thermostat is actuated in accordance with the actual temperature of the cooling medium, even though remote from the conduits of the cooling system, by means of a bleeder tube extending into heat exchanging relation with the bellows for circulating a part of the cooling medium into heat exchanging relation with the thermosensitive fluid therein. As illustrated this bleeder tube has an inlet branch 37 which enters the bellows through the shell 28 and head 31, a coiled part 38 within the chamber formed by the bellows to give the proper heating surface, and an outlet branch 39 leaving the bellows through the head 31 and shell 28. The branch 37 entering the bellows extends from the shell 31 into the coupling conduit 10 of the cooling system and has a belled end 40 positioned in the path of flow of the cooling medium. The return branch 39 of the bleeder tube also extends into the coupling conduit 10 and has its end pointed in the opposite direction from the end 40. With this construction the medium in the cooling system as it flows from the engine jacket in passing from the engine to the radiator will enter the bell shaped end 40 and due to its velocity head will force the column of the medium within the bleeder tube through the coil and outlet branch 39, the end 41 being so positioned in the fluid flow as to increase the effect of circulation. The thermosensitive fluid within the bellows will thus be subjected to the same temperature as the cooling medium and be influenced in accordance with the changes in temperature of the engine.

The operation is as follows: At the time of starting the automobile, the engine will be cold, and the thermosensitive fluid condensed, the bellows retracted and the shutters 15 closed. Upon starting the engine the medium in the cooling system will be circulated from the lower header 7 through the conduit 11, water jacket of the engine, upper conduit 10 to the upper header 6, the medium then returning by gravity through the tubes 9 to the lower header 7. As the engine continues running, the temperature of the cooling medium will be increased until such time as the temperature of the cooling medium vaporizes the thermosensitive fluid in the bellows 30 in its circulation through the bleeder tube 37, 38 and 39. At this time the bellows will be expanded and the head 34 and link 26 moved to the left as viewed in the drawing, which through the bell crank, will actuate the arm 18 to open the shutters 15 and allow a circulation of air through the radiator. As the temperature of the engine is effected by the temperature of the water entering the engine jacket, and as the thermostat is directly dependent in its operation upon the temperature of the cooling medium leaving the engine jacket, the effective area of the radiator is so controlled as to tend to maintain the temperature of the engine substantially constant at all times.

Also with this construction the bleeder tube circulates only a small part of the total body of cooling medium through the thermosensitive fluid, and as the circulation through the bleeder tube stops with the engine, it dissipates its heat long before the main body of cooling medium, whereby the shutters are closed. This feature is not only advantageous in the structure illustrated for holding the engine at a high temperature for longer periods than is possible when the thermostat is subjected to the main body of the cooling medium, but is also adaptable for use with other structures in maintaining the hot medium in the engine jacket and preventing a subsequent thermosyphon effect such as by a choke in the cooling system.

In the embodiment shown in Fig. 2 the thermostat is of the cup type in which a stationary cylindrical shell 45 is provided with a head 46 at one end and forms the stationary part and is attached to a rigid structure by means of the legs 29. This cylindrical shell 45 together with the collapsible and extensible bellows 47 telescoped within the shell forms a closed chamber adapted to contain the thermosensitive fluid. The bellows as in Fig. 2 has a tubular corrugated wall to provide the necessary flexibility and is closed at its inner end by a rigid head 48 having a block 49 at its outer side bored and tapped to receive the end 36 of the link 26. The open and outer end of the bellows 50 is sealed to the inner cylindrical wall of the shell 45 adjacent its open end as by means of a ring 51. In this cup-type thermostat the head 48 of the bellows constitutes a movable wall for the sealed chamber which is subjected to the pressure of the thermosensitive fluid. In the lateral wall of the shell a port 52 is provided for charging the chamber with the thermosensitive fluid and is adapted to be sealed by suitable means held therein as by soldering or welding. In this construction the inlet branch 37 of the bleeder tube extends through the head 46 of the shell and is tightly sealed therein, the tube being coiled within the chamber in the same manner as described in the structure of Fig. 2 with the outlet branch 39 extending out through the head 46 and sealed thereto. This bleeder tube as in Figs. 1 and 2 is adapted to circulate the cooling medium through the thermosensitive fluid for subjecting the same to a temperature in accordance with the temperature of the engine. The operation of the regulating apparatus with this type of thermostat is the same as that described with respect to the thermostat shown in Fig. 2.

It will now be readily apparent that a novel regulating apparatus has been provided in a unit which may be easily and quickly attached to any standard type of automobile radiator, without necessitating any structural changes or additional equipment to the engine itself. Further, it will be seen that this regulator unit may be actuated in accordance with the actual temperature of the cooling medium in a positive and efficient manner due to the circulation of a part of the cooling medium through the thermosensitive fluid. Still further it will be apparent that a novel regulator unit has been provided which is compact, simple and economical of manufacture.

It will also be obvious that the invention is not limited to the specific forms described and illustrated in the drawing but is capable of a variety of mechanical embodiments. For instance, the invention in its broader aspects may employ any other suitable means for varying the effect of the cooling system in place of the shutters, as for example a valve in the cooling system; other suitable forms of heat exchanger for circulating the cooling medium through the thermosensitive fluid may be employed; also the thermostat may be provided if desired, with a spring opposing expansion thereof, etc. Various other changes, which will now appear to those skilled in the art, may be made in the form, details of construction and arrangement of parts without departing from the spirit of the invention, and reference is therefore to be had to the appended claims for a definition of the limits of the invention.

What is claimed is:

1. In an automobile, in combination with an internal combustion engine, a cooling system for said engine including a radiator, and shutters for varying the effective area of said radiator, a thermostat for automatically actuating said shutters and comprising an expansible medium, and a bleeder tube in said cooling system and extending into said medium for subjecting the thermostat to the temperature of the cooling medium in the system.

2. In an automobile, in combination with an internal combustion engine, a cooling system for said engine, and means for varying the effect of said cooling system, a thermostat for automatically actuating said means and including a thermosensitive medium, and a bleeder tube extending from said cooling system into the thermostat for subjecting the thermosensitive medium of said thermostat to the temperature of the cooling medium in the system.

3. In an automobile, in combination with an internal combustion engine, a cooling system for said engine, and means for varying the effect of said cooling system, a thermostat including an expansible and collapsible chamber mounted outside of said cooling system for automatically actuating said means, and a bleeder tube extending from said cooling system and coiled within said thermostat chamber for subjecting the thermostat to the temperature of the cooling medium in the system.

4. In an automobile, in combination with an internal combustion engine, a cooling system for said engine including a radiator, and shutters for varying the effective area of said radiator and including a chamber for a thermosensitive fluid, a thermostat for automatically actuating said shutters, a bleeder tube within said chamber of the thermostat, and means for circulating the cooling medium of said system through said tube.

5. In an automobile, in combination with an internal combustion engine, a cooling system for said engine including a radiator, and shutters for varying the effective area of said radiator, a thermostat for automatically actuating said shutters comprising a contractible and expansible bellows confining a thermosensitive fluid, and a bleeder tube extending from said cooling system and into said fluid for subjecting the thermosensitive fluid to the temperature of the circulating system.

6. In an automobile, in combination with an internal combustion engine, a cooling system for said engine, and means for varying the effect of said cooling system, a thermostat for automatically actuating said means comprising a contractible and expansible bellows confining a thermosensitive fluid, a bleeder tube within said fluid, and means connecting said bleeder tube with said circulating system whereby the thermostat will be subjected to the temperature of the cooling medium in the system.

7. In combination with an internal combustion engine, a cooling system for said engine, and means for varying the effect of said cooling system, a thermostat including an expansible and collapsible member mounted outside of said cooling system for automatically actuating said means and means for actuating the thermostat from the temperature of the cooling medium by circulating into the interior of said expansible and collapsible member a relatively small fraction of the medium in the main cooling system.

8. In an automobile, in combination with an internal combustion engine, a cooling system for said engine including a radiator, and shutters for varying the effective area of said radiator, operating means for said shutters, a thermostat for automatically actuating said operating means, said thermostat comprising a frame attached to said radiator and an expansible and contractible bellows having one end rigidly fixed to said frame and providing a chamber for a thermosensitive fluid, a connecting rod between the other end of said bellows and the operating means, and a bleeder tube within said thermostat chamber and connected to the cooling system whereby the shutters will be operated in accordance with the temperature in the cooling system.

9. A thermostat for regulating the temperature of a cooling medium, comprising an expansible and contractible bellows confining a thermosensitive fluid, and a bleeder tube extending into said bellows and immersed in said fluid for circulating the cooling medium in heat exchanging relation with said thermosensitive fluid.

10. A thermostat for regulating the temperature of the cooling medium in a circulating system comprising an expansible and contractible bellows confining a thermosensitive fluid, and a bleeder tube coiled within said fluid and adapted to circulate the cooling medium from said system through the thermosensitive fluid.

11. A thermostat for regulating the temperature of the cooling medium in a circulating system of an automobile comprising an expansible and contractible bellows containing a thermosensitive fluid, said bellows having a stationary head and a movable head for actuating a controlling mechanism, and a bleeder tube extending through said stationary head and within said bellows for circulating the cooling medium through said thermosensitive fluid.

12. A thermostat for regulating the temperature of the cooling medium in a circulating system of an automobile, comprising a closed chamber containing a thermosensitive fluid, said chamber having a rigid outer wall and a collapsible and extensible inner wall, and a bleeder tube extending through said outer wall and into said chamber for circulating the cooling medium through said thermosensitive fluid.

13. A thermostat for regulating the temperature of the cooling medium of a circulating system of an automobile comprising a chamber containing a thermosensitive fluid and having a cylindrical shell closed at one end and a collapsible and extensible bellows within the shell having a movable head at one end and connected at the other end to the inner wall of the shell, and a bleeder tube extending through the head of said shell and said chamber and adapted to circulate the cooling medium through the thermosensitive fluid.

14. In combination with an internal combustion engine and a cooling system therefor, means for varying the cooling effect of said system, a thermostat mounted outside of said cooling system for actuating said means and including an expansible and collapsible chamber containing a thermosensitive fluid, and a bleeder tube communicating with said cooling system and extending into said chamber and immersed in the thermosensitive fluid within said thermostat.

15. In combination with an internal combustion engine and a cooling system therefor, means for varying the cooling effect of said system, a thermostat mounted outside of said cooling system for actuating said means and including an expansible and collapsible chamber containing a thermosensitive fluid, and a bleeder tube communicating with said cooling system and extending into said chamber and immersed in the thermosensitive fluid within said thermostat, said tube having its ends so arranged within said system as to induce a circulation of the cooling medium through said tube.

JEAN V. GIESLER.